US007013132B2

(12) United States Patent
Kehr

(10) Patent No.: US 7,013,132 B2
(45) Date of Patent: Mar. 14, 2006

(54) METHOD FOR THE PROVISION AND ALLOCATION OF CALL NUMBERS IN A TELECOMMUNICATION NETWORK

(75) Inventor: Klaus Kehr, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/489,234

(22) PCT Filed: Sep. 11, 2002

(86) PCT No.: PCT/DE02/03372

§ 371 (c)(1),
(2), (4) Date: Apr. 12, 2004

(87) PCT Pub. No.: WO03/024074

PCT Pub. Date: Mar. 20, 2003

(65) Prior Publication Data

US 2005/0032546 A1 Feb. 10, 2005

(30) Foreign Application Priority Data

Sep. 11, 2001 (DE) .......................................... 101 44 726

(51) Int. Cl.
*H04M 3/42* (2006.01)
*H04M 1/00* (2006.01)
*H04M 15/06* (2006.01)
*H04Q 7/20* (2006.01)

(52) U.S. Cl. .................... 455/415; 455/551; 455/414.1; 455/461; 379/142.09; 379/201.01
(58) Field of Classification Search ................. 455/551, 455/415, 414.1, 461, 445, 403; 379/142.09, 379/201.01
See application file for complete search history.

(56) References Cited

U.S. PATENT DOCUMENTS

| 5,428,666 | A | * | 6/1995 | Fyfe et al. .................. 455/551 |
| 5,512,855 | A | * | 4/1996 | Kimura ................. 340/825.52 |
| 5,512,885 | A | * | 4/1996 | Agestam et al. ....... 340/825.52 |
| 5,590,184 | A | | 12/1996 | London ...................... 379/142 |
| 6,327,353 | B1 | | 12/2001 | Fukuzawa et al. ..... 379/201.01 |
| 2002/0128022 | A1 | * | 9/2002 | Whitezel .................... 455/461 |

FOREIGN PATENT DOCUMENTS

| CA | 2371135 | 11/2000 |
| EP | 0 847 177 | 6/1998 |
| EP | 0 986 237 | 3/2000 |
| EP | 1 175 073 | 1/2002 |
| WO | WO 97/45988 | 12/1997 |

OTHER PUBLICATIONS

"ESTI TS 100 518 v7.0.0; Digital Cellurlar Telecommunications System (Phase 2+); Closed User Group (CUG) Supplementary Services—Stage 1 (GSM 02.85 Version 7.0.0 Reasel 1998", Aug. 1999.

* cited by examiner

*Primary Examiner*—William Trost
*Assistant Examiner*—Wesley Kim
(74) *Attorney, Agent, or Firm*—Baker & Daniels

(57) ABSTRACT

The invention relates to a method for the provision and allocation of call numbers in a telecommunication network. According to said method, the call numbers are allocated to the subscribers of the telecommunication network, in addition to the available subscriber call numbers. A plurality of number contingents containing temporary anonymous TAC call numbers is made available and allocated to at least one management entity. The TAC call numbers of the number contingent can be individually or collectively allocated to the subscribers upon request, e.g. from a subscriber, by precisely allocating a TAC call number of a contingent to an available subscriber call number.

20 Claims, 1 Drawing Sheet

Figure 1:
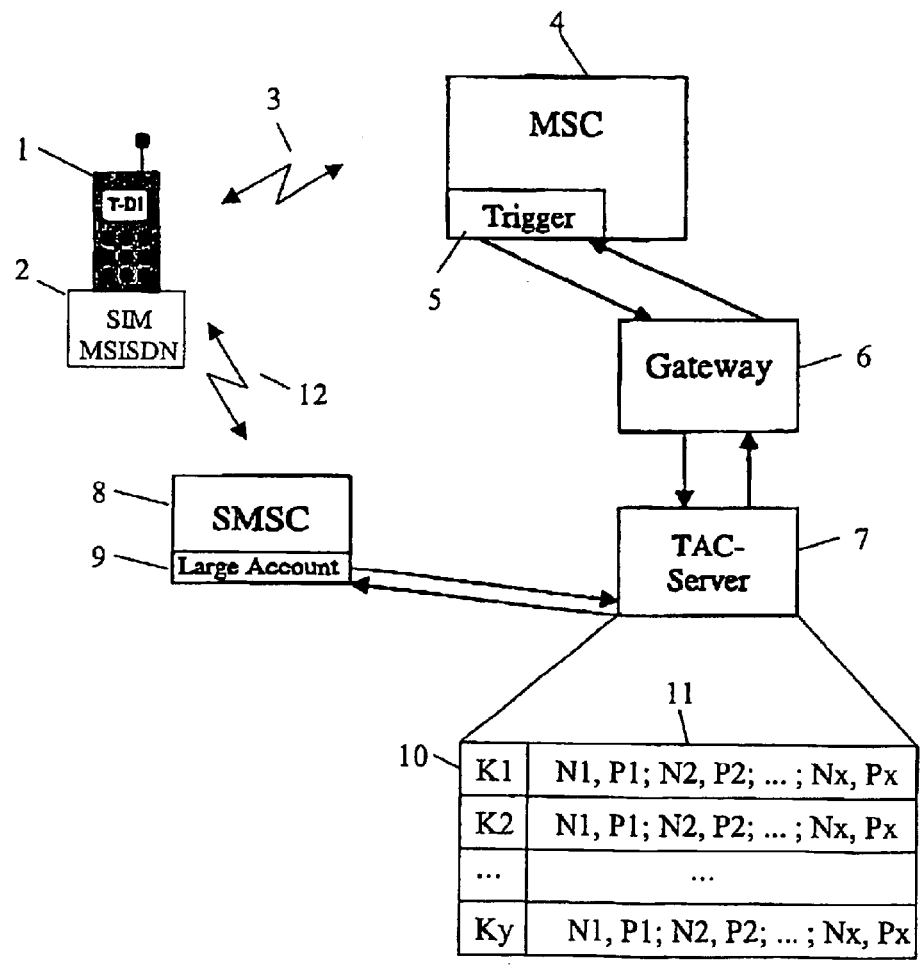

METHOD FOR THE PROVISION AND ALLOCATION OF CALL NUMBERS IN A TELECOMMUNICATION NETWORK

The invention concerns a procedure for the allocation and assignment of telephone numbers in a telecommunications network.

Currently, one subscriber telephone number (MSISDN) per subscriber identity module (SIM card) is assigned to a subscriber in a mobile network. If the mobile telephone is turned on and no call diversion or such is activated, then the subscriber can be reached under this telephone number by anyone. For this reason, there is a certain danger in making this number known to a large, potentially anonymous group of people, since the probability for annoyance or even misuse increases with the increasing divulgence of the telephone number. This point has new importance, especially in the mobile phone network, since telephones are normally carried around all of the time. This problem also exists in the fixed telephone network, whereby however several telephone numbers can be assigned to one subscriber connection. Generally speaking, these are easier to "keep secret." If a subscriber appears as a caller, in modern communications networks, he can either completely eliminate the display of his telephone number to the communications partner by means of the Calling Line Identification Restriction (CLIR) service or his (the one MSISDN) telephone number is displayed based on the Calling Line Identification Presentation (CLIP) service. The display of a situation- or target-number-dependent subscriber identification number, under which the caller is also reachable for the person called, is not possible.

U.S. Pat. No. 5,590,184 A discloses a procedure for assigning a randomly selected, anonymous telephone number to a subscriber in a telecommunications network, whereby the telephone number is used instead of the actual subscriber telephone number and the subscriber appears to other subscribers under this anonymous telephone number. Each anonymous telephone number is assigned separately and individually to a subscriber. A similar procedure is disclosed in U.S. Pat. No. 6,327,353 A.

The document ETSI, TS 100 518, V7.0.0, 1999-08, Digital Cellular Telecommunications System (Phase 2+); Closed User Group (CUG) Supplementary Services—Stage 1 (GSM 02.85 Version 7.0.0 Release 1998 concerns the "closed user group" supplementary service, which is offered in the GSM mobile network. The members of the user group are identified based on their telephone number. The formation and use of telephone number contingents of any type is not described.

The problem of the invention is to suggest a procedure for the allocation and assignment of telephone numbers in a telecommunications network, through which, in addition to the existing subscriber numbers, the subscribers in the communications network can be assigned additional temporary and anonymous telephone numbers that considerably decrease the danger of undesired annoyance or misuse of a telephone number or that can only be implemented for specific purposes or user groups.

This problem is solved by the characteristics given in claim 1. Advantageous embodiments and continuations of the invention are given in the dependent patent claims.

The suggested procedure enables a subscriber in a telecommunications network to provide himself with temporary, anonymous telephone numbers, also called temporary anonymous connections (TAC) below, from specific (for example, made available by different providers) number contingents. This is possible without concluding new contracts with a network operator or provider or giving out additional SIM cards.

A specific profile, in which the type of accessibility (e.g. service type: SMS and/or telephony), accessibility times, the period of validity, and other characteristics are determined, can be associated with each individual TAC number. Via a TAC number configured in this manner, the subscriber can only be reached for a limited period of time, only via selected services, and only at times of day determined by the subscriber.

During the lifespan of a TAC number, it can be turned off and on at any time, e.g. by sending an SMS to the administrative instance. In a further expansion stage, the profiles are expanded further through so-called "blacklists" or "whitelists" that ensure for each call that certain persons can never reach the TAC number (blacklist) or only selected persons can reach the TAC number (whitelist).

The number contingents can be open or closed. Closed means that only members of the group (of a contingent) can communicate with each other, while a TAC number from an open contingent is principally reachable for everyone. Furthermore, for calls within a closed group, the TAC number of the caller instead of his MSISDN is always displayed as the CLI (Calling Line Identification).

By dialing an appropriate prefix before the actual telephone number, the subscriber can cause his TAC number to appear as the CLI.

The normal handling of telephone traffic using the subscriber telephone numbers (e.g. MSISDN) assigned to the subscriber is not affected by the procedure. That is, regardless whether a temporary TAC telephone number is used, whether or not it is blocked, the subscriber is reachable as usual under his MSISDN and can also use all services at any time. The use of the CLIR (Calling Line Identification Restriction) feature also functions without restrictions for the TAC telephone numbers.

A subscriber can thus now give a configurable and disengageable TAC telephone number for certain purposes, without his MSISDN becoming known. This considerably reduces the danger of misuse and annoyance for the subscriber. With the establishment of blacklists and whitelists, certain callers can be excluded right from the start.

The advantages are obvious. The anonymity of the subscriber is ensured through an assigned TAC telephone number, since the TAC telephone number is only temporarily valid and is not listed in a telephone directory. The subscriber can assign one or more TAC telephone numbers to himself at any time without having to conclude a new subscriber contract or having to obtain a new SIM. The subscriber can configure his TAC telephone numbers via online interfaces.

The establishment and allocation of TAC telephone numbers can be implemented relatively easily by the network operator.

A preferred embodiment of the invention is explained below based on a drawing. Additional characteristics, advantages, and applications of the invention result from this. In the example, the use of the procedure is described in a mobile network. Use in a fixed network can be implemented in a similar manner.

FIG. 1 shows an example of the technical components for implementing the procedure in accordance with the invention.

ALLOCATION OF THE NUMBER CONTINGENTS

The number contingents 10 are allocated by the network operators or, as the case may be, by other providers. This means that the network operator determines how many contingents 10 there are and how many TAC telephone numbers 11 each contingent contains. The contingents 10 are assigned to one or more administrative instances (TAC servers) 7, which are then responsible for handling the service. The administrative instances are tied to the mobile network e.g. via a gateway 6, displayed here in a simplified manner by switching center 4. The network operator must ensure that each administrative instance 7 receives the connection data for all transactions that concern contingents managed by it. With telephony, this can occur e.g. through the establishment of triggers 5 in the switching centers (MSC) 4 and, with the short message service, through so-called large accounts 9 in the short message service center (SMSC) 8. In order to enable these mechanisms with the network operator, the TAC telephone numbers must therefore comply with a number schema that always allows a clear assignment of TAC telephone numbers to the appropriate contingent.

For example, all TAC telephone numbers N1; ... ; Nx from contingent K1 can begin with 111, from contingent K2, with 22, etc. so that a clear assignment is possible. In this manner, however, due to the limited number of possible triggers 5, only relatively few contingents K1; ... ; Ky can be established.

The most advantageous appears to be a multi-layered schema in which an administrative instance 7 provided especially for this service first contains the data for all transactions that concern this service. This administrative instance can then either regulate the distribution of the contingents 10 and the TAC telephone numbers 11 to other administrative instances or it can take over further processing itself.

The TAC telephone numbers 10 would then be established according to the following schema:

$$N = t_1 \ldots t_a\, k_1 \ldots k_b\, n_1 \ldots n_c,$$

whereby, $t_1 \ldots t_a$: unique identifier of the service $k_1 \ldots k_b$: unique identifier of the contingent K $n_1 \ldots n_c$: unique telephone number (only within the contingent $k_1 \ldots k_b$ Registration of Subscribers for Contingents After the tailoring of the contingents 10, the distribution of the TAC telephone numbers 11 to the subscribers takes place. For this, each TAC telephone number 11 from a contingent is assigned the unique MSISDN of the subscriber. In particular for this reason, each subscriber can only receive a maximum of one TAC telephone number from one contingent. However, other TAC telephone numbers from other contingents can be assigned.

As a rule, two procedures are possible for the assignment of MSISDN to TAC telephone numbers:

individual assignment:

The participant wants to register for a specific contingent K1, but does not know whether there are still free TAC telephone numbers. (For example, he heard about it from a newspaper/on TV/on the radio). With his mobile telephone 1, he sends e.g. a registration SMS 12 to an appropriate service number (alternative: via phone call, email, Web interface, ... ) that is forwarded to the appropriate administrative instance 7. If there are still TAC telephone numbers available in the contingent K1, he receives a confirmation with his TAC telephone number.

collective assignment:

The subscriber receives a certain TAC telephone number (for example, from the organizer of a telephone party on a pin together with an admission ticket) which he then sends to a corresponding service number for activation in a registration SMS (alternative: via phone call, email, Web interface, ... ).

Configuration of the Profile

A profile R containing e.g. the following characteristics is linked to each TAC telephone number:

reachability intervals

The subscriber can determine at which times of day he wants to be reached via the TAC telephone number. (For example, Monday through Friday from 6:00 pm to 9:00 pm)

type of service

The subscriber can determine whether he wants to be reachable via his TAC telephone number only for SMS, only for telephony, or for both blacklist The subscriber can determine which senders (defined via TAC telephone numbers or MSISDN) should not reach his TAC telephone numbers whitelist The subscriber can determine which senders (defined via TAC telephone numbers or MSISDN) should exclusively reach his TAC telephone numbers Other embodiments of the profile are possible. The handling of profile R ideally takes place via a Web interface. Alternatively, the call of a service number and the sending of SMS or email are also possible.

Turning the Number On and Off/Reconfiguration

So that the subscriber is always able to activate/deactivate reachability via his TAC telephone number, an SMS interface is offered.

With his mobile phone 1, he sends a change SMS 12 (for activation/deactivation) to a certain telephone number (alternative: via a phone call, email, ... ). The reachability of his TAC telephone number is appropriately changed.

Likewise, the activation/deactivation can also be performed for individual services only (for SMS/telephony only).

Alternatively to the suggested configuration via SMS, a telephone call, email, Web interface can also be used.

Use of the TAC Telephone Number a. For Incoming (MT: Mobile Terminated)-SMS and Incoming (MT) Calls:

If a telephone subscriber A with the $MSISDN_A$ wants to use the TAC telephone number $N_B$ of a subscriber B with the $MSISDN_B$ for a service (call, SMS), the following circumstances should be noted:

the TAC telephone number $N_B$ belongs to a closed contingent K

Subscriber A can only use the service for subscriber B if he is also registered for the contingent K. He thereby received the TAC telephone number $N_A$. If the profile R configured for $N_B$ allows it, the service can be used, i.e. the subscriber B can be reached. $N_A$ is displayed as the telephone number for the sender.

the TAC telephone number $N_B$ belongs to an open contingent K

Subscriber A can use the service for subscriber B in any case, if the profile R configured for $N_B$ allows it. The following is displayed as the telephone number for the sender:

the $MSISDN_A$, if subscriber A dialed the telephone number of subscriber B without a prefix the TAC telephone number $N_A$, if A is registered for the contingent K, received the TAC telephone number $N_A$ from there, and authorized the display of this telephone number by dialing an appropriate prefix (see above) regardless of the registration for the contingent K and the profile R associated with the $N_B$, the $MSISDN_B$ can always be used without restriction.

if subscriber A activated the CLIR feature, his telephone number is not displayed in any case (neither TAC telephone number nor MSISDN).

For Outgoing (MO: Mobile Originated)-SMS and Incoming Calls

If a telephone subscriber A wants to have his TAC telephone number displayed as CLI (regardless whether the contingent K is closed or open), the following procedure is selected. The subscriber dials as a prefix the identifier of the service $t_1, \ldots, t_a$ followed by the identifier of the contingent $k_1 \ldots k_b$, then a special character (e.g. #), followed by the target telephone number (TAC telephone number or MSISDN). In this manner, a routing of the service takes place via the administrative instance 7 (TAC server), which can then employ the TAC telephone number of the subscriber from the appropriate contingent K (insofar as the subscriber is registered for the contingent). Alternatively, the use of a proprietary service number for this feature is also possible.

Billing Options

There are several options for the billing of the service:

the easiest option is the establishment of a general rate for the service number. All calls to a TAC telephone number are then charged in the same manner additionally, the TAC server 7 could create billings tickets (VAS tickets) to levy charges for the use of the service The establishment of a much more refined rate scale is also possible. For example, separate rate schedules can be established for each contingent K.

There are many applications for the procedure based on the invention. Here are a few examples.

In advertisements: The subscriber can give his TAC telephone number in an advertisement and can then only be reached at the configured times. Upon successful conclusion, the TAC telephone number is blocked and no further calls can be made. No one can determine the identity of the provider via telephone directories etc. This use of the invention is a good alternative to ciphering services.

At exhibitions and trade fairs: During the exhibition, organizers/consultants/salespeople are permanently reachable. After the exhibition is over, the TAC telephone numbers lose their validity.

For SMS and telephone parties: Each participant receives a TAC telephone number from the organizer that he can make known to anyone. During the party (and perhaps a little longer), he can be reached at this telephone number, but not after this. If he does not want any more contacts even during the event, he can deactivate the service at any time.

LIST OF REFERENCES

1 Mobile Station
2 SIM (with MSISDN)
3 Call
4 Switching Center (MSC)
5 Trigger
6 Gateway
7 Administrative Instance (TAC Server)
8 Short Message Service Center (SMSC)
9 Large Account
10 Number Contingent
11 TAC Telephone Number+Telephone Number Profile
12 Short Message

What is claimed is:

1. Procedure for the allocation and assignment of telephone numbers in a telecommunications network, whereby the telephone numbers are assigned to the subscribers of the telecommunications network in addition to the existing subscriber telephone numbers, comprising the following steps:

providing of a number of number contingents containing temporary, anonymous TAC telephone numbers;

assigning of number contingents to at least one administrative instance;

assigning individual or collective TAC telephone numbers of the number contingent through the administrative instance to the subscriber, in that a TAC telephone number of a contingent is assigned to exactly one existing subscriber telephone number upon request, characterized in that the contingents are either open number contingents, the TAC telephone numbers of which are reachable for everyone, or closed contingents, the TAC telephone numbers of which are only reachable for other TAC telephone numbers of the same contingent, whereby the TAC telephone number of the caller is always displayed as the telephone number display for calls within a closed contingent.

2. Procedure in accordance with claim 1, characterized in that each individual TAC telephone number is assigned its own telephone number profile, in which the service type, the reachability times, and the period of validity of the TAC telephone number can be determined by the subscriber and/or the provider.

3. Procedure in accordance with claim 1, characterized in that either the TAC telephone number or the subscriber telephone number is displayed as the telephone number display for calls from a TAC telephone number of an open contingent.

4. Procedure in accordance with claim 1, characterized in that the administrative instance is connected to the telecommunications network and is supplied with the connection information of the individual TAC telephone numbers of the contingents managed by it.

5. Procedure in accordance with claim 1, characterized in that the TAC telephone numbers comply with a number schema that allows the administrative instance and the devices of the telecommunications network to uniquely assign a TAC telephone number to a contingent.

6. Procedure in accordance with claim 1, characterized in that the subscriber can perform an establishment, a configuration, and an activation/deactivation of the TAC telephone numbers at any time.

7. Procedure in accordance with claim 1, characterized in that a mobile network is used as the telecommunications network.

8. Procedure in accordance with claim 2, characterized in that the administrative instance is connected to the telecommunications network and is supplied with the connection information of the individual TAC telephone numbers of the contingents managed by it.

9. Procedure in accordance with claim 3, characterized in that the administrative instance is connected to the telecommunications network and is supplied with the connection information of the individual TAC telephone numbers of the contingents managed by it.

10. Procedure in accordance with claim 2, characterized in that the TAC telephone numbers comply with a number schema that allows the administrative instance and the devices of the telecommunications network to uniquely assign a TAC telephone number to a contingent.

11. Procedure in accordance with claim 3, characterized in that the TAC telephone numbers comply with a number schema that allows the administrative instance and the devices of the telecommunications network to uniquely assign a TAC telephone number to a contingent.

12. Procedure in accordance with claim 4, characterized in that the TAC telephone numbers comply with a number schema that allows the administrative instance and the devices of the telecommunications network to uniquely assign a TAC telephone number to a contingent.

13. Procedure in accordance with claim 2, characterized in that the subscriber can perform an establishment, a configuration, and an activation/deactivation of the TAC telephone numbers at any time.

14. Procedure in accordance with claim 3, characterized in that the subscriber can perform an establishment, a configuration, and an activation/deactivation of the TAC telephone numbers at any time.

15. Procedure in accordance with claim 4, characterized in that the subscriber can perform an establishment, a configuration, and an activation/deactivation of the TAC telephone numbers at any time.

16. Procedure in accordance with claim 5, characterized in that the subscriber can perform an establishment, a configuration, and an activation/deactivation of the TAC telephone numbers at any time.

17. Procedure in accordance with claim 2, characterized in that a mobile network is used as the telecommunications network.

18. Procedure in accordance with claim 3, characterized in that a mobile network is used as the telecommunications network.

19. Procedure in accordance with claim 4, characterized in that a mobile network is used as the telecommunications network.

20. Procedure in accordance with claim 5, characterized in that a mobile network is used as the telecommunications network.

* * * * *